Aug. 23, 1960 F. M. KREMPEL ET AL 2,950,093

CONTAINER FOR ELECTRONIC EQUIPMENT

Filed Aug. 16, 1956 2 Sheets-Sheet 1

INVENTORS:
FRANK M. KREMPEL
RAYMOND A. ANDERSON
BY Benjamin H. Wapper

ATT'Y

Aug. 23, 1960 F. M. KREMPEL ET AL 2,950,093

CONTAINER FOR ELECTRONIC EQUIPMENT

Filed Aug. 16, 1956

2 Sheets-Sheet 2

INVENTORS:
FRANK M. KREMPEL
RAYMOND A. ANDERSON

BY

ATT'Y

United States Patent Office 2,950,093

Patented Aug. 23, 1960

2,950,093

CONTAINER FOR ELECTRONIC EQUIPMENT

Frank M. Krempel, Prospect, and Raymond A. Anderson, Wood Dale, Ill., assignors to Stewart-Warner Corporation, Chicago, Ill., a corporation of Virginia Filed Aug. 16, 1956, Ser. No. 604,454

5 Claims. (Cl. 257—256)

Our invention relates generally to containers for electronic equipment, and more particularly to an improved container provided with cooling means for electronic equipment such as is to be used in aircraft at high altitudes.

In using electronic equipment in aircraft at high altitudes, it is not feasible, because of the rarefied atmosphere, and hence lower specific heat of the air, to utilize the customary method of cooling such heat emitting components as vacuum tubes and the like, by the circulation of air past such components. Furthermore, it is sometimes desirable to seal hermetically the electronic equipment to prevent undesirable effects of fluctuations in pressure upon the components of the electronic equipment.

It is thus an object of our invention to provide an improved container for electronic apparatus, which is employed as means for dissipating heat generated by components of the electronic apparatus, and which, if desired, may be employed hermetically to seal the electronic apparatus.

A further object is to provide an improved housing or container for electronic equipment, in which a large part of the container walls comprise heat radiators.

A further object is to provide an improved container for electronic equipment, having walls and partitions acting as heat exchangers and in which a liquid medium is utilized to transfer heat from the electronic components to the container walls.

A further object is to provide an improved means for filling the closed hydraulic cooling system with the hydraulic medium while at the same time exhausting air therefrom.

Other objects will become apparent from the following description, reference being had to the accompanying drawings in which Fig. 1 is a plan view of the container for electronic equipment, portions thereof being broken away to show details of construction;

Figure 1:
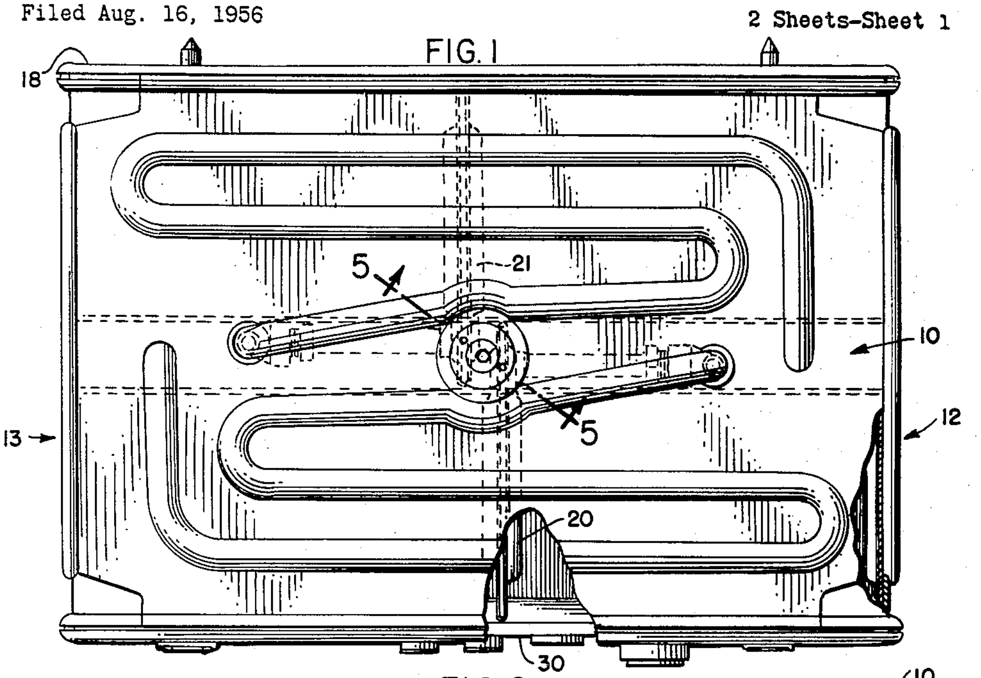

In general, the container comprises a top 10, end walls 12 and 13, preferably formed integrally with the top, a front closure 16, and rear wall 18. The container also includes central partition members 20 and 21.

Figure 4:
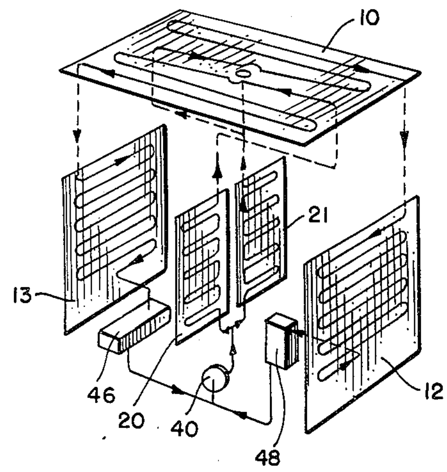
Fig. 4 is a diagrammatic view showing the flow paths of the hydraulic cooling medium.

Generally speaking, the top 10 and end walls 12 and 13, as well as the partition walls 20 and 21, are each composed of two sheets of metal which are seam welded, or brazed, to one another, and have formed therein suitable passageways 26 which together form continuous conduits for the flow of cooling hydraulic fluid as best illustrated diagrammatically in Fig. 4. Although shown separated in Fig. 4, the end walls 12 and 13 are preferably formed as sheets integral with the top 10.

The front closure 16 is secured to the container by locking hinge clamps 28. Beneath the front closure 16 there is provided a socket panel 30 for the reception of plug connectors to connect the apparatus within the container to other electronic assemblies.

The container walls are preferably made of stainless steel, and the side and end walls are welded to the bottom 32. The rear wall 34 may be hinged to the remaining wall of the container or may be welded thereto, depending upon installation requirements.

Figure 2:
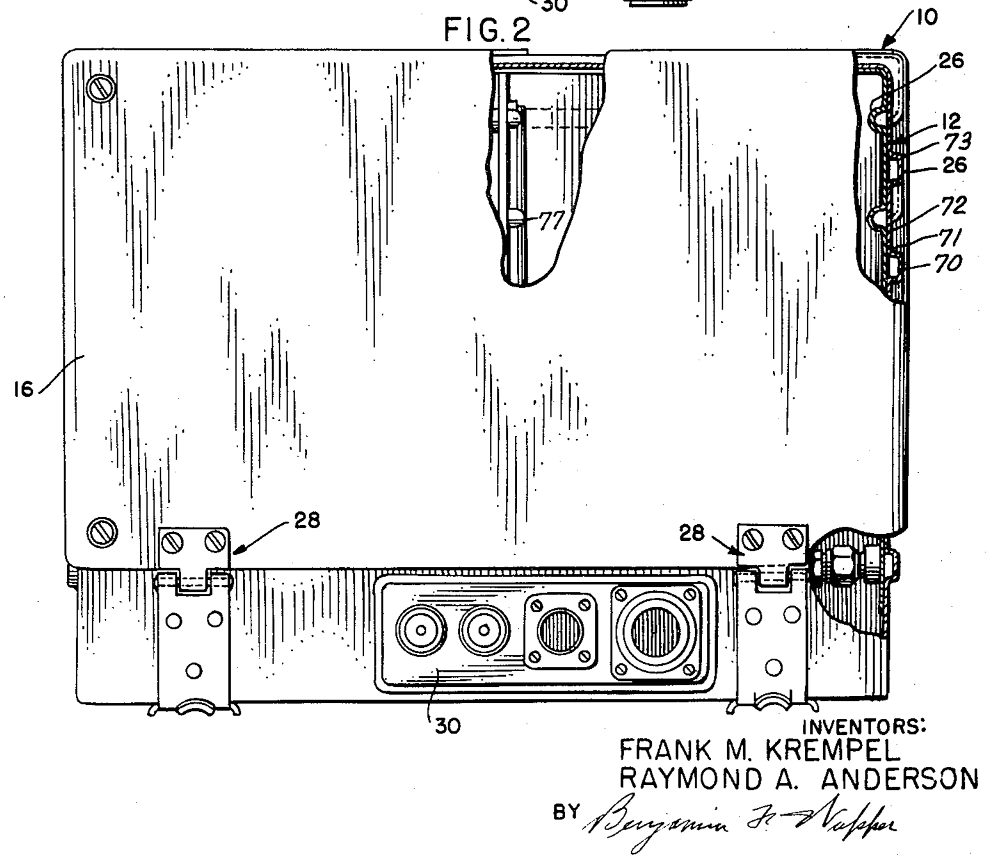
Fig. 2 is a front elevational view of the container, with portions thereof being broken away to show details of construction.
Figure 3:
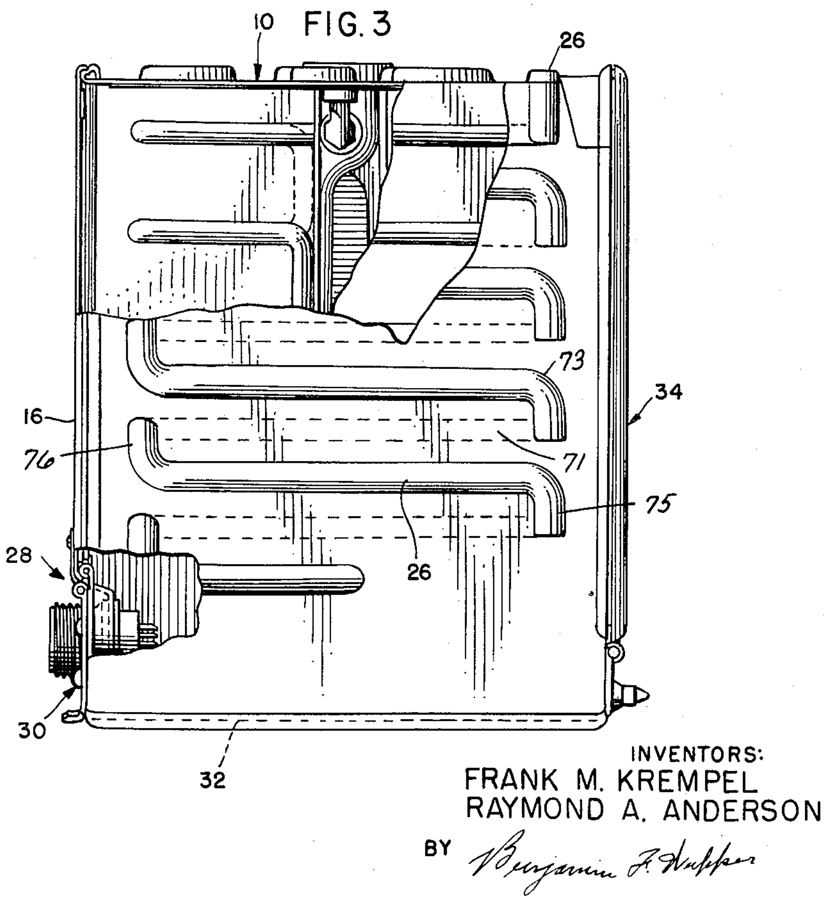
Fig. 3 is an end elevational view of the container, likewise with portions broken away to show details of construction.

It can be seen in Figs. 2 and 3 that the end wall 12 comprises an inner plate 70 having a plurality of spaced inwardly projecting recesses 71. An outer plate 72 adjacent the plate 70 includes a plurality of spaced outwardly projecting recesses 73. The recesses 71 and 73 are disposed in horizontal positions occurring alternately in vertically spaced relation along the end wall 12. With particular reference to Fig. 3, it can be seen that each end of each recess 73 includes vertically disposed extensions 75 and 76 which communicate with the adjacent inner recesses 71.

Thus, the recesses 71 together with the juxtaposed engaging portions of the opposite plate 72 and the recesses 73, 75 and 76 together with the juxtaposed engaging portions of the plate 70 define the fluid passageway 26 provided in the end wall 12. The opposite end wall 13 is similarly formed.

The central partitions 20 and 21 include recesses 77 on either side of the partitions. The recesses 77 on either side of the partitions 20 and 21 project toward and are vertically aligned with corresponding recesses such as 71 of the end walls 12 and 13.

In a typical installation, the rib structure defining the opposed recesses 71 and 77 may be utilized as supports for the shelves (not shown) for carrying the electronic apparatus. It is common in the electronic packaging art to connect the heat producing electronic components in good heat conducting relationship with their metallic shelves or trays. Thus it can be seen that the trays which are held by and therefore in good heat conducting relationship with the recesses 71 and 77 form an excellent unbroken heat conducting path from the electronic components to the rib surfaces of the recesses 71 and 77. Accordingly, a substantial portion of the heat produced by the electronic components is transferred directly to the rib surfaces of the recesses 71 and 77 for transfer to the cooling fluid carried therein.

Also, the precise passageway construction defined by the plates 70 and 72 gives rise to efficient yet low cost heat transfer surfaces for the cooling fluid.

Attention is directed to an additional important feature brought about by the unique end wall passageway construction. The greatest amount of heat transfer occurs at those portions of the recesses 71 which engage the electronic component shelves, that is at least the inner and upper longitudinal portion of each recess. The fluid flowing in closest proximity to this recess portion will have the greatest amount of heat transferred thereto. As it flows in the opposite direction through the next adjacent outwardly projecting recess 73, this fluid will also be closest to the upper and outer longitudinal surface of the recess 73. Therefore, the fluid which has absorbed the greatest amount of heat will dissipate the greatest amount.

Thus, a remarkably more efficient, yet inexpensive heat transfer construction is provided. This is particularly advantageous in the packing of electronic apparatus where space, and therefore the capacity of the cooling means in relation to space, is at a premium. An additional advantage is provided by the applicants' particular end wall passageway construction. As shown in Fig. 3, the cooling fluid sequentially flows through an inwardly extending recess 71, then through an adjacent outwardly extending recess 73, to provide alternate heat absorption and heat dissipation in a most efficient manner thereby to prevent the building up of excessive cooling fluid temperatures at any position along the end walls 12 and 13.

Still another important advantage is achieved by the use of applicants' unique end wall construction. By providing recesses in both of the sheet metal plates 70 and 72 and by providing appreciable overlapping engagement of the plates 70 and 72 between adjacent recesses 71 and 73, and by providing vertical extensions at either end of each recess 73, an unusually rigid and sturdy supporting structure is achieved. Such construction has been found to be definitely superior to a construction in which recesses are provided in only one of the two sheet metal end wall plates.

As best indicated in Fig. 4, a small electric motor driven pump 40 is provided to circulate hydraulic fluid through the passageways 26. The hydraulic fluid employed is preferably a hydrocarbon or silicone oil which at very low temperatures maintains a low viscosity so that it may be freely circulated through the cooling system.

The pump 40 discharges through parallel passageways formed in the partition and heat collecting plates 20 and 21, and forces the cooling fluid through parallel passageways formed by hollow ribs in the top 10. Thus, heat picked up from various electronic components within the container and radiated and conducted to the partitions 20 and 21 is in part dissipated by radiation and convection from the top 10. The two liquid conducting passageways in the top 10 are connected to similar passageways in the ends 12 and 13, respectively, of the container, in which the temperature of the liquid is further lowered. Coolant from the end 13 is supplied to a housing 46 for a power supply transformer or other component which generates a large amount of heat, and is then returned to the inlet of pump 40. The cooling liquid from the end 12 is supplied to a housing 48 for a radio frequency head assembly (or similar apparatus) which likewise generates a large amount of heat and requires special cooling. Fluid which has passed through the housing 48 is returned to the pump 40 for recirculation through the system.

It will be seen that a substantial portion of the external surface of the container is employed as a heat radiator and thus is capable of limiting the temperature rise within the container to a value which will not deleteriously affect the functioning of the electronic components contained therein.

The container serves the dual purpose of housing the electronic equipment and providing an extended heat radiating surface.

Figure 5:
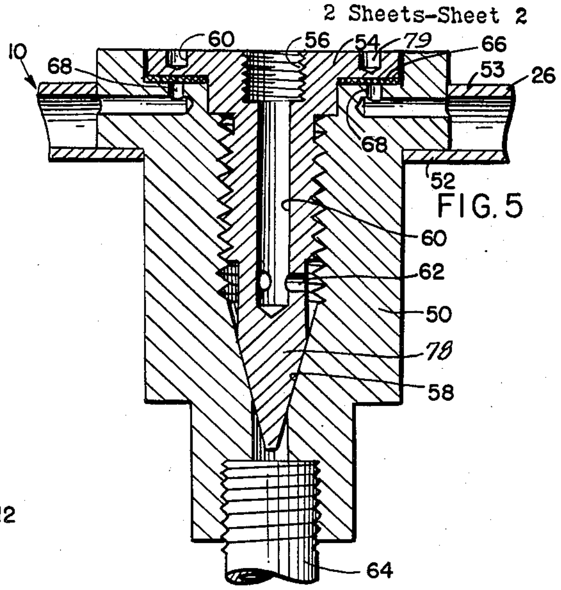
Fig. 5 is a vertical sectional view, taken on the line 5—5 of Fig. 1, showing the improved valve means for controlling the admission of hydraulic fluid to the cooling system, as well as the venting of air therefrom.

In order to assure that the liquid conveying system shall be free from entrapped air, an improved valve mechanism is employed. This valve is shown in Fig. 5 as comprising a body 50 suitably welded to sheets 52 and 53 forming the top 10 of the container. A valve member 54 is suitably threaded in the body 50 and has a needle valve portion 78 engaging a seat 58 in the valve body. The valve member 54 is provided with a threaded inlet 56 for connection to a suitable source of hydraulic fluid and communicates with a central passageway 60 and radial ports 62. Thus when the valve member 54 is unscrewed by a suitable spanner or wrench engaging in socket 79, fluid may be pumped into the inlet 56, bore 60, and ports 62, past valve seat 58, into a filler pipe 64, which is suitably connected to the hydraulic flow passageway 26, preferably adjacent the pump 40.

Upon unscrewing the valve member 54, a gasket 66 is raised from vent ports 68 which communicate with the passageway 26 on the container top and thus permit free venting of air from the system as the hydraulic fluid is supplied. The pump 40 is of the centrifugal type and has sufficient clearance so that hydraulic fluid may pass through it in a direction opposite to which the fluid is forced by the pump.

The electronic components may be secured to shelves and to the bottom 32, all of which are secured in good heat conducting relationship with the end walls 12 and 13, and the partitions 20 and 21. Similarly, the partitions 21 and 22 are secured in good heat conducting contact with the top 10, so that top and end walls 12 and 13 form a substantially unitary "heat sink" for the dissipation of the heat conducted and radiated thereto from the electronic componets mounted in the container.

The container thus operates as a highly effective means to dissipate heat from electronic equipment contained therein. Some of the heat of the components of such apparatus is radiated to the partitions 20 and 21 and there transferred to the hydraulic fluid flowing therethrough, and is thereafter transferred to the top 10 and end walls 12 and 13, the latter serving as extended surfaces for radiation of the heat. Some of the heat may also be radiated directly to the ends 12 and 13, as well as to the sides of the container, and efficiently radiated therefrom to maintain the electronic apparatus at the necessary low operating temperature. Individual components which generate substantial amounts of heat are preferably individually encased and supplied with the hydraulic fluid, more rapidly to carry the heat therefrom.

While we have shown and described a preferred embodiment of our invention, it will be apparent that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. In a container for air-borne electronic equipment including a top, a bottom, and a plurality of walls enclosing the equipment, a fluid cooling system comprising a fluid distribution line, a pump for circulating fluid through the line, certain of the container walls having an inner and an outer sheet metal elements secured together with their juxtaposed surfaces in engagement, each of the elements including a plurality of spaced recesses, the recesses of the inner element projecting inwardly into the container in generally parallel relation to define extended heat absorbing surfaces, the recesses of the outer element projecting outwardly from the container in generally parallel relation to define extended heat dissipating surfaces, successive recesses in one of the elements appearing in positions intermediate successive recesses in the other element, one of the elements defining recesses inclined at an angle with and connecting the parallel recesses to form a first continuous passageway, the top having an inner and an outer sheet metal elements secured together with their juxtaposed surfaces in engagement, at least one of the top elements including recesses defining a second passageway, and structure defining a fluid connection between the passageways and the distribution line, thereby to provide highly efficient heat transferring sections for the cooling system.

2. In a container for air-borne electronic equipment including a top, a bottom, and a plurality of walls enclosing the equipment, a fluid cooling system comprising a fluid distribution line, a pump for circulating fluid through the line, certain of the walls having an inner and an outer sheet metal elements secured together with their juxtaposed surfaces in engagement, and a plurality of spaced ribs defining recesses in each of the elements, the ribs in the inner elements projecting inwardly into the container in spaced horizontal planes to define extended heat transfer surfaces capable of supporting the equipment housed in the container, the ribs in the outer element projecting outwardly to define extended heat transfer surfaces, successive ribs in one of the elements appearing respectively in positions intermediate and respectively connected with successive ribs in the other element to form a single continuous passageway, said passageway comprising an efficient heat transfer section of the distribution line.

3. In a container for air-borne electronic equipment including a top, a bottom, front and back walls, and a pair of end walls enclosing the equipment and including a central partition intermediate the end walls, a fluid cooling system comprising a fluid distribution line, a pump for circulating fluid through the line, each of the end walls having an inner and an outer sheet metal elements secured together with their juxtaposed surfaces in engagement, a plurality of spaced ribs defining recesses in each of the elements, the ribs in the inner element of each end wall projecting inwardly into the container in spaced horizontal planes to define extended heat transfer surfaces capable of supporting the equipment housed in the container, the ribs in the outer element of each end wall projecting outwardly to define extended heat transfer surfaces, successive ribs in one of the elements of each end wall appearing respectively in positions intermediate successive ribs in its corresponding other element, ribs in one of the elements in each end wall defining recesses inclined at an angle with the first-mentioned recesses in its respective wall and connecting succeeding recesses to form a single continuous passageway in each end wall, the top having inner and outer sheet metal elements secured together with their juxtaposed surfaces in engagement, ribs in at least one of the top elements defining a passageway, ribs on either side of the central partion projecting toward and aligned with inwardly projecting ribs on the adjacent end walls to define a passageway having an extended heat transfer surface capable of supporting the equipment housed in the container, and structure defining a fluid connection between the passageways and the distribution line.

4. In a container for air-borne electronic equipment of the type in which a pump circulates fluid through a closed distribution system including a passageway defined by recesses formed in at least one of a pair of sheet metal plates secured together to form the container top, a fluid filling valve means mounted substantially flush with the container top and comprising a body extending through and secured to the top plates in substantially flush relation therewith and including a central bore and counterbore defining a valve seat, structure connecting the bore in fluid conducting relation with the distribution system, an adjustable needle valve received in the counterbore and engageable in its innermost position with the valve seat to seal the bore from the counterbore, the needle valve in a closed position thereof being substantially flush with the body, the needle valve defining a passageway connecting the counterbore to an exterior portion of the valve, the body defining a vent passageway in the upper portion thereof connecting the distribution system passageway to atmosphere, and a gasket interposed between the body and the needle valve to seal the vent passageway in the closed position of the valve on the seat and to vent the container passageway to atmosphere in the open, fluid filling position of the valve.

5. In a container for air-borne electronic equipment including a top, a bottom, and a plurality of walls enclosing the equipment, a fluid cooling system comprising a fluid distribution line, certain of the container walls having an inner and an outer sheet metal elements secured together with their juxtaposed surfaces in engagement, a series of ribs disposed side by side in the certain walls with certain adjacent ends of successive ribs being connected in fluid conducting relation to define a single series connected fluid passageway in each said certain wall in which fluid reverses its direction as it passes from one rib to the next adjacent rib, alternate ribs being formed respectively in the inner and outer wall elements defining respectively extended heat absorbing and heat dissipating surfaces, whereby the fluid engaging the inner peripheral surfaces of the ribs on each inner element will also engage the outer peripheral surfaces of the ribs in its respective outer element, and structure defining a fluid connection between the passageways and the distribution line.

References Cited in the file of this patent

UNITED STATES PATENTS

| | | |
|---|---|---|
| 1,374,905 | Casey et al. | Apr. 19, 1921 |
| 1,924,007 | Weatherhead | Aug. 22, 1933 |
| 2,057,505 | Tarleton | Oct. 13, 1936 |
| 2,143,976 | Crosley et al. | Jan. 17, 1939 |
| 2,249,622 | Schlumbohm | July 15, 1941 |
| 2,301,938 | Tatur | Nov. 17, 1942 |
| 2,469,828 | Johnson | May 10, 1949 |
| 2,643,282 | Greene | June 23, 1953 |
| 2,654,226 | Duncan et al. | Oct. 6, 1953 |
| 2,682,158 | Powell | June 29, 1954 |
| 2,737,785 | Morton | Mar. 13, 1956 |